March 20, 1962

W. A. MOREY ETAL
CRANE LOAD BRAKES 3,026,462

Filed Dec. 6, 1956

INVENTORS
WOODRUFF A. MOREY
VICTOR H. AMES
BY

March 20, 1962 W. A. MOREY ETAL 3,026,462
CRANE LOAD BRAKES
Filed Dec. 6, 1956 9 Sheets-Sheet 2

FIG. 2

INVENTORS
WOODRUFF A. MOREY
VICTOR H. AMES
BY

March 20, 1962

W. A. MOREY ETAL

3,026,462

CRANE LOAD BRAKES

Filed Dec. 6, 1956

INVENTORS
WOODRUFF A. MOREY
VICTOR H. AMES
BY

FIG. 6

INVENTORS
WOODRUFF A. MOREY
VICTOR H. AMES
BY

FIG. 7

INVENTORS
WOODRUFF A. MOREY
VICTOR H. AMES
BY

INVENTORS
WOODRUFF A. MOREY
VICTOR H. AMES
BY

March 20, 1962 W. A. MOREY ETAL 3,026,462
CRANE LOAD BRAKES
Filed Dec. 6, 1956 9 Sheets-Sheet 8

Fig.11

Inventors
Woodruff A. Morey
Victor H. Ames
by Woodruff A. Morey
Attorney

Fig. 12

United States Patent Office 3,026,462
Patented Mar. 20, 1962

3,026,462
CRANE LOAD BRAKES
Woodruff A. Morey, Homewood, and Victor H. Ames, Midlothian, Ill., assignors to Whiting Corporation, a corporation of Illinois
Filed Dec. 6, 1956, Ser. No. 627,540
24 Claims. (Cl. 318—302)

This is a continuation-in-part of application Serial No. 532,295, filed September 2, 1955, now abandoned. This invention refers in general to means for controlling the speed of a variable torque motor or engine, and is more specifically directed to the control speed and braking of a variable torque electric motor applied to a hoist or a similar mechanism.

In various devices such as hoists it is frequently desirable to regulate closely the speed of movement of a load regardless of the mass of the load in either a hoisting or a lowering direction. Alternating current motors of the wound rotor type are widely employed for driving such devices, since by increasing the amount of resistance in the secondary or armature circuit of the motor a certain degree speed control may be attained. This form of speed regulation is, however, not highly satisfactory since the true effect of increasing secondary resistance is merely to reduce the torque of the motor. Thus, the desired speed is attained only in instances where the torque of the motor at the desired speed is balanced against the load and the setting to attain this speed, therefore, varies with each load. Perhaps more serious is the inability of such motors to strongly resist any tendency of the load to overrun or drive the motor.

Both friction brakes and electro-dynamic brakes have been employed for artificially loading the motor in such manner that reasonable speed control is attained. Friction brakes are notoriously difficult to control accurately and maintain and develop heat under hard usage which can be dissipated at only a limited rate. Electro-dynamic brakes also generate considerable heat and produce only relatively low braking effort at low speeds where accurate regulation is of maximum importance. These electro-dynamic brakes together with the control equipment are also relatively complex and expensive.

Specifically in the case of hoisting devices, two separate brakes are ordinarily required. One of these is conventionally referred to as a motor brake and is arranged to act directly on the motor shaft. The motor brake employs shoes forcing against a drum by spring pressure and released by energization of a solenoid usually connected in the motor circuit. The other of these brakes is a load brake, usually of the mechanical or Weston type, located in the gear train and employs friction surfaces forced together by the overrunning action of the load. Both brakes require regular maintenance and convert the mechanical energy absorbed into heat which can be dissipated only at a limited rate. Electro-dynamic brakes have been substituted in some instances for the mechanical load brake, but in addition to the objectionable characteristics previously mentioned, are also incapable of exerting any braking effort in the absence of a supply of electrical energy.

One of the primary objectives of this invention is the provision of a simplified brake and speed control device which is adapted to limit in a positive manner the speed of movement of a load connected to a variable torque motor or engine, including a condition of zero speed, without requiring the use of friction surfaces or an external source of energy.

More specifically, the important objects of this invention include the provision of an effective and inexpensive device for imposing an accurately variable counter-torque upon a variable torque driving device without utilization of friction surfaces or external brake energy and for automatically regulating the torque of the driving device in such manner as to insure movement of a load at a desired speed regardless of the mass of the load.

Further objects of this invention include the provision of a novel brake and torque regulating device particularly adapted for use on overhead crane trolleys, adapted for and incorporating means for control from a remote location, for the rapid and convenient dissipation of heat and for assuring application of the brake in the event of power failure.

Still further objects include an electrically controlled valve wherein the solenoid and spring opposing each other to open and close the valve are balanced or matched, as to their effective rates, so that in response to various voltages applied to the solenoid, the valve will be accurately positioned in any number of partially opened positions, usable with advantage in the above system.

These and other objects of this invention will become more fully apparent from the following description and from the appended drawings in which.

In brief, this invention contemplates the attachment of a positive displacement hydraulic pump to a motor shaft or other suitable portion of the driving mechanism of a hoist or a similar device, the pump being supplied with hydraulic fluid from a reservoir or the like. A variable orifice device, such as a flow control valve, is arranged in the pump discharge line and may be operated from a remote location by a servo motor or the like. The driving motor includes means such as switches and resistors or a throttle for limiting its torque, this means being connected to a pressure responsive member such as a piston which is in turn connected between the pump outlet and the flow control valve. Once the control valve is opened to a selected speed setting and energy supplied to the driving motor, the latter will increase in speed until the desired speed is reached. At this point the pressure between the pump outlet and the control valve will reach a point sufficient to actuate the pressure responsive member which in turn reduces the torque of the driving member until it is substantially that required to sustain the desired speed for the particular load involved. Spring means, operating a valve, are provided for blocking the pump outlet in the event of power failure or return of the controller to a neutral position by the operator. Since the pump is of the positive displacement type, blocking the outlet prevents movement of the pump and therefore of the motor, thus providing a positive load brake without friction surfaces which can be easily cooled and which requires little maintenance or adjustment.

Since this invention is applicable more directly to alternating current motors of the wound rotor type, the following detailed description will be confined to such form. However, the pressure responsive means may obviously be connected to an engine throttle or other similar device for limiting the torque of the driving member and therefore, the invention is not confined exclusively to the control of electric motors.

Figure 1:
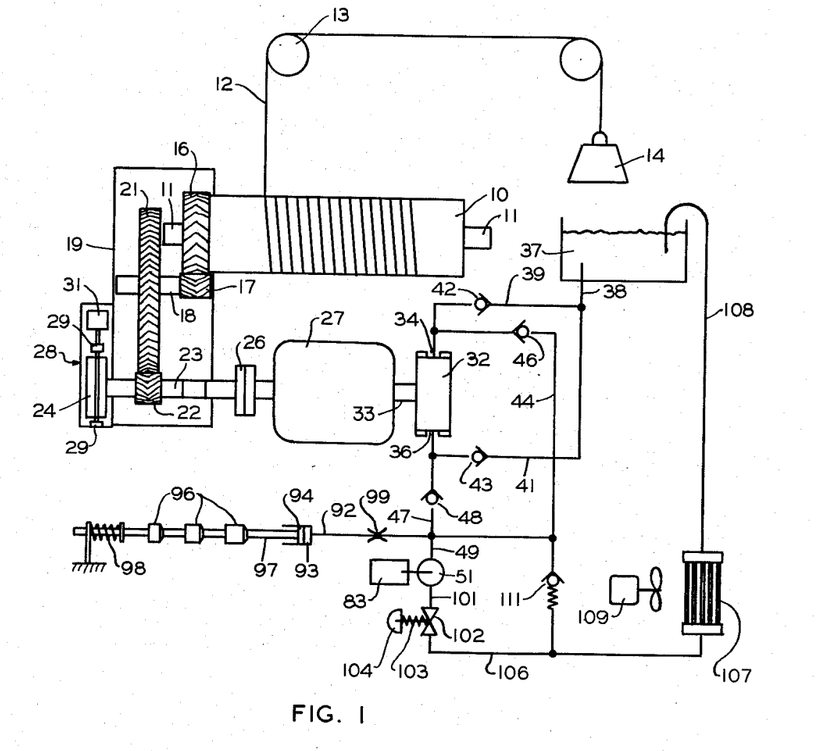
FIGURE 1 is a schematic view of a hoisting device incorporating this invention.

The general arrangement of the device is illustrated in FIGURE 1 which represents schematically a hoist such as those used on the trolleys of overhead cranes. A cable drum 10 is mounted for rotation on bearings 11 and is secured to a flexible cable 12 reeved over sheaves 13 and adapted for attachment to a load 14. A gear 16, secured to the cable drum 10, meshes with gear 17 mounted on shaft 18 journaled within a gear box 19. Motor gear 21 is mounted on shaft 18 and meshes with pinion 22 affixed to shaft 23 also suitably journaled in the gear case 19. A motor brake wheel 24 is secured to one end of the shaft 23, the other end of the shaft being secured to one member of a coupling 26, the other member of which is connected to a shaft 33 of a motor 27, usually of the alternating current wound rotor type.

A motor brake, generally designated 28, is of conventional design and usually incorporates a pair of spring loaded brake shoes 29 normally engaging the brake wheel 24. A solenoid 31 is mechanically coupled to the shoes 29 and releases them from engagement with the brake wheel 24 when energized.

A positive displacement pump 32 is connected directly to shaft 33 of motor 27 or at any other suitable point in the gear train, such as to gears 16, 17, 21, and 22. This pump 32 must be a positive displacement pump but may be of the gear, the vane, the piston, or other suitable type and must be coupled mechanically in a positive manner to the hoisting device since its function is to serve both as a brake and a speed regulating device. The pump 32 has a first port 34 and a second port 36 either of which may be inlet or outlet ports depending upon the direction of rotation.

A reservoir 37 for suitable hydraulic fluid, such as oil, is preferably located somewhat above the pump 32 and is connected to an outlet pipe 38 which is in turn connected to pipes 39 and 41. Check valves 42 and 43 are arranged in the pipes 39 and 41 respectively in such manner as to permit flow of oil through pipes 39 and 41 to pump ports 34 and 36 respectively but to block flow in the reverse direction. Port 34 is also connected to pipe 44 which includes a check valve 46 arranged in such manner as to permit flow from port 34 through valve 46 into pipe 44. Port 36 is connected to a pipe 47 which includes a check valve 48 and also arranged to permit discharge from port 36 through valve 48 to pipe 47. Pipes 44 and 47 are both connected to a common discharge pipe 49 which is in turn connected to a suitable throttling valve 51.

Figure 3:
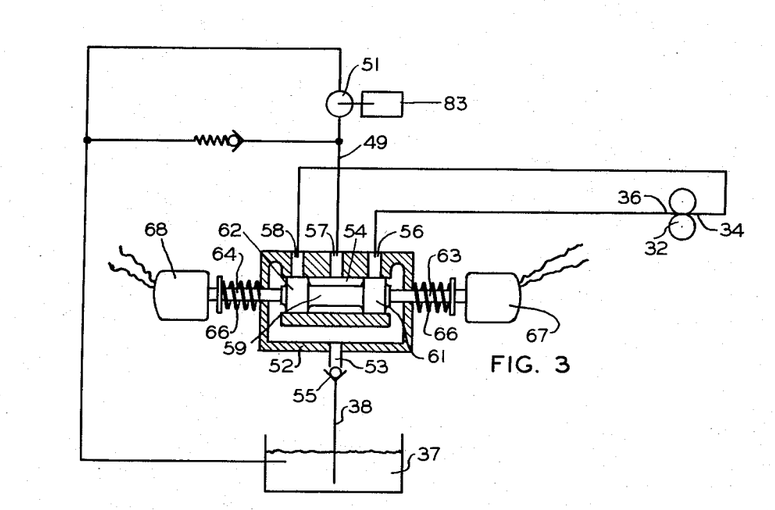
FIGURE 3 is a schematic diagam of a valve usable in connection with the device illustated in FIGURE 1.
Figure 4:
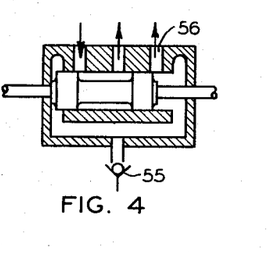
FIGURE 4 is a schematic elevation of the valve shown in FIGURE 3 in one position.
Figure 5:
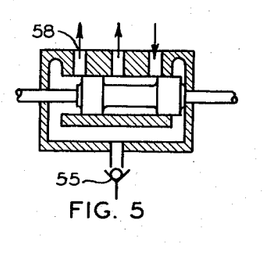
FIGURE 5 is a partial elevation of the valve shown in FIGURE 3 in another position.

From the foregoing, it will be noted that regardless of the direction of the rotation of the pump 32, hydraulic fluid will be drawn into one of the ports 34 and 36 and will be discharged from the other port into the pipe 49. While this end result is desirable from the standpoint of simplification, it is not necessary to employ the specific arrangement described. An alternative arrangement is illustrated in FIGURES 3–5 and includes a valve body 52 having an inlet port 53 communicating with reservoir discharge pipe 38 through a check valve 55. The interior of the body 52 includes a cylindrical bore indicated at 54 communicating at each end with the port 53 and also communicating with ports 56, 57, and 58. Port 57 is a discharge port communicating with pipe 49 and throttle valve 51. Port 56 is connected to port 36 of the pump 32 and port 58 is connected with port 34 of the pump 32. A valve 59 is slidably mounted in the bore 54 and includes lands 61 and 62 arranged to block ports 56 and 58 when valve 59 is in neutral position. Valve stems 63 and 64 extend outwardly through the body 52 in sliding sealed relation therewith. Springs 66 are provided on the valve stems 64 and 63 to automatically return the valve 59 to neutral position. Solenoids 67 and 68 are connected to the valve stems 63 and 64 for moving the valve into the position illustrated in FIGURE 4 when solenoid 68 is energized or into the position shown in FIGURE 5 when the solenoid 67 is energized. As will be apparent from the illustrations, fluid cannot be discharged from the pump 32 when the valve is in the position illustrated in FIGURE 3. When solenoid 68 is energized as shown in FIGURE 4, ports 56 and 36 can serve only as inlet ports since the reverse flow of oil is blocked by check valve 55. The pump 32 and the motor 27 can run only in such direction as to discharge fluid through ports 34 and 58. When the solenoid 67 is energized, the valve assumes the position shown in FIGURE 5 in which the ports 58 and 34 can serve only as inlet ports, reverse flow of fluid being blocked by check valve 55.

Figure 2:
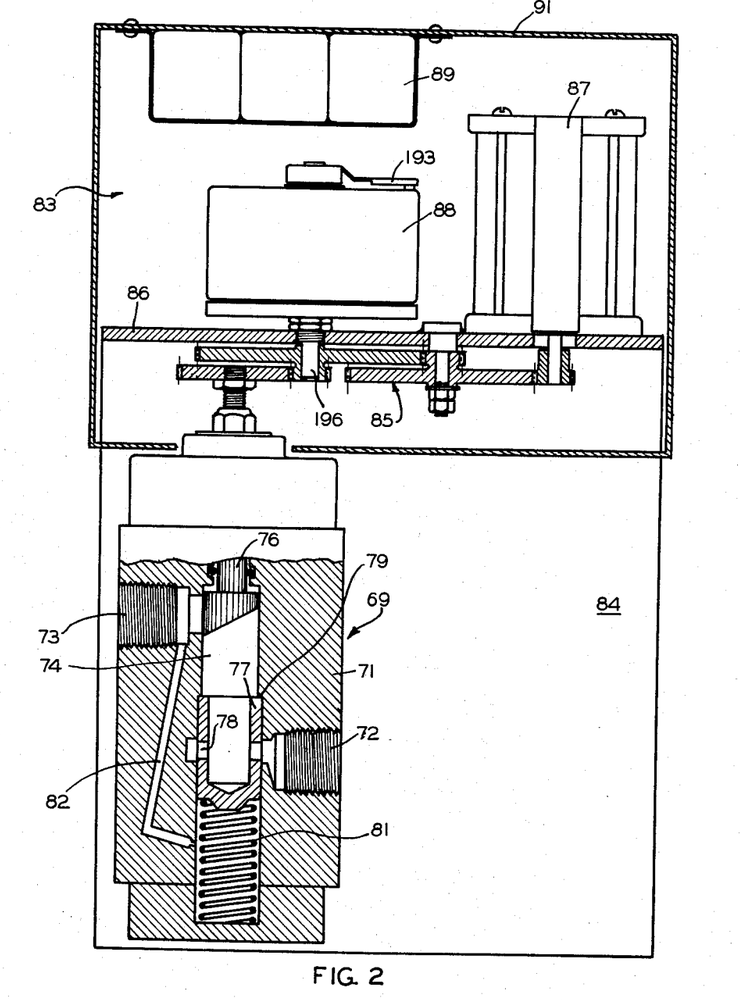
FIGURE 2 is a partial plan view of a servo mechanism constituting a portion of the device illustrated in FIGURE 1.

The valve 51, which regulates the flow of fluid through the discharge pipe 49 may be a conventional valve of the type adopted for throttling flow, such as a needle valve. Preferably however the valve 51 is of the type known commercially as a flow control valve, a typical example of which is illustrated in FIGURE 2. The flow control valve, generally designated 69, includes a body 71 having a threaded inlet port 72 and an outlet port 73 connected by a transversely extending internal bore 74. An operating stem 76 extends into the body 71 in rotatable sealed relation therewith and fits snugly within the bore 74, the inner end of the stem 76 being truncated in the manner shown whereby rotation of the stem 76 opens and closes the outlet 73. A piston 77 having radial ports 78 is slidably mounted within the bore 74 and is urged against a shoulder 79 by a spring 81. With the spring 81 in its extended position the ports 78 in the piston 77 are in alignment with the inlet 72. A conduit 82 connects the outlet 73 with the portion of the bore 74 containing the spring 81.

The function of this device is to discharge a given volume of liquid regardless of fluctuations in the inlet pressure of the liquid. The stem 76 is rotated to a predetermined setting, thereby forming an orifice between the bore 74 and the outlet 73, through which the liquid must flow. Any increase in inlet pressure will, under such circumstances, increase the pressure within the bore 74 depressing the piston 77 and thereby restricting the flow of oil entering the bore 74 through the inlet 72 and the ports 78. A reduction in pressure will, of course, cause the reverse action. Thus the pressure within the bore 74 and the flow across the orifice between the bore 74 and the outlet 73 will be substantially constant. This type of valve is considered desirable for use with the subject inventions since the flow through the valve and therefore, the speed of the pump 32 and the motor 27 will be maintained substantially constant regardless of the load imposed. It is thus possible to predetermine the rate of travel of the load 14 by the setting of the valve 51 regardless of the torque imposed on the pump 32 either by the motor 27 or the load 14.

In the case of an overhead crane it will be apparent that the valve 51 should be located on the trolley, which moves along the overhead supporting beams or bridge. In such structures the operator's cab is conventionally secured to the bridge in a fixed location thereby making it desirable to control the setting of the valve 51 from a remote location. This is accomplished by the provision of a suitable servo motor 83, one form which is shown in greater detail in FIGURE 2. The servo motor 83 and the flow control valve 69 may be mounted on a common base 84 including an upright member 86. A gear train 85 connects the stem 76 of the valve 69 with a two phase motor 87 and with a variable auto transformer 88. Capacitors 89, required for operation of the motor 87 may be mounted within an enclosure 91 containing the gear train 85, the motor 87 and the variable auto transformer 88.

A pipe 92 connects the discharge pipe 49 with a hydraulic servo motor, such as a cylinder 93 and piston 94 which is shiftable in such manner as to reduce the torque of the motor 27 when the hydraulic pressure in the line 49 exceeds a predetermined value. Various devices may be employed to accomplish this function but that illustrated includes a plurality of cam surfaces 96 secured in spaced relation on a piston rod 97 attached to the piston 94. A spring 98 is employed to urge the piston 94 in a direction opposite to its movement under the influence of hydraulic pressure. Movement of the cam surfaces 96 directly or indirectly operate to vary the resistance in the secondary circuit of the wound rotor motor 27, the resistance preferably being increased as the rod 97 moves outwardly under the influence of hydraulic pressure. Since the response of the motor 27 to a change in resistance is not instantaneous, an orifice 99 or other similar device may be employed to retard the movement of the piston 94.

A discharge pipe 101 connects the valve 51 or the discharge port 73 of the valve 69 with a solenoid valve 102 having spring 103 adapted to hold the valve in closed position. A solenoid 104 is employed to open the valve when energy is supplied to the motor 27. A pipe 106 connects the outlet of the valve 102 to a heat exchanger 107, the outlet of which communicates with the reservoir 37 through the pipe 108. Under normal conditions, the heat exchanger 101 is not required and is utilized only when the duty required of the hoisting unit is severe. A fan and motor 109 may be employed to drive air across the surfaces of the heat exchanger 107. A relief valve 111 interconnects the pipe 49 with the pipe 106 and serves to limit the pressure to which the hydraulic system may be subjected.

Figure 6:
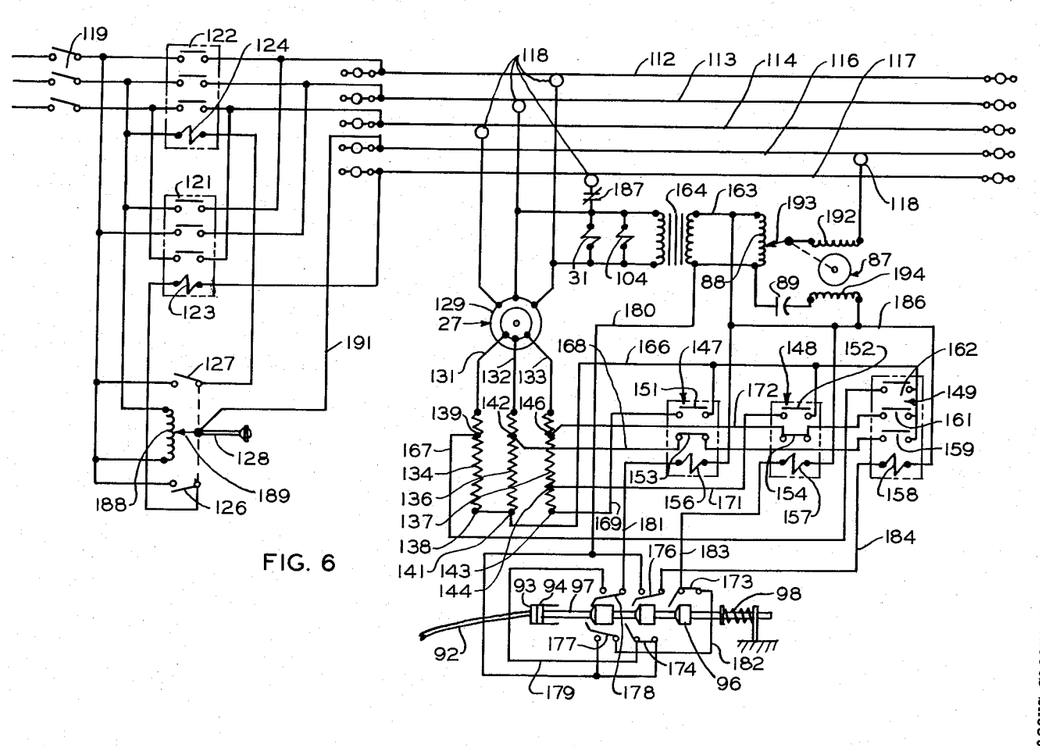
FIGURE 6 is a schematic diagram of an electrical circuit suitable for use in connection with the device illustrated in FIGURE 1.

The electrical connections required for utilization of the device shown in FIGURE 1 on the trolley of an overhead crane are shown diagrammatically in FIGURE 6 and include trolley wires 112, 113, 114, 116 and 117 usually arranged along the side of the bridge girders of the overhead crane. Suitable sliding pickups 118 are carried by the trolley in engagement with the trolley wires and transmit power to the trolley. Three phase electric current is supplied to the bridge through disconnect switch 119 and is connected to a hoist contactor 121 and a lowering contactor 122 in conventional manner. The hoist contactor 121 has an operating coil 123, the lowering contactor having a corresponding coil 124 adopted to be energized alternately by switches 126 and 127 respectively. A control handle 128 is pivotally mounted in the operator's cab and arranged in such manner that movement of the handle toward the operator closes switch 126 energizing the hoist contactor 121 which permits current to flow through the wires 112, 113, and 114. This power is transmitted through the pickups 118 to the stator 129 of the motor 27. Movement of the control handle in the opposite direction closes switch 127 energizing coil 124 and lowering contactor 122 which reverses the relative position of two of the leads 112, 113, and 114, thereby causing the motor 27 to revolve in the opposite direction. When the control handle 128 is in neutral position, both switches 126 and 127 are open. Preferably the handle 128 is biased by springs in conventional manner to insure return to a neutral position when the handle is released.

The motor 27 has secondary circuit leads 131, 132, and 133 connected respectively to resistors 134, 136 and 137. Resistor 134 has a terminal tap 138 and an intermediate tap 139. Resistor 136 has a terminal tap 141 and an intermediate tap 142. Resistor 137 has a terminal tap 143 and intermediate taps 144 and 146. Relays 147, 148 and 149 are provided for switching the resistance in the secondary circuit of the motor 27, the relays 147 and 148 having a pair of normally open contacts 151 and 152 respectively in addition to a pair of normally closed contacts 153 and 154 respectively. Operating coil 156 actuates relay 147 while coil 157 actuates relay 148. Relay 149 has an operating coil 158 plus three normally open pairs of contacts 159, 161 and 162. Taps 138 and 141 of resistors 134 and 136 are connected by a wire 166 which is also connected to one pole of the normally open contacts 151, 152, 159, 161, and 162. Terminal 139 on resistor 134 is connected by wire 167 to the other pole of contact 162. Terminal 142 on resistor 136 is connected by wire 168 to normally closed contact 153 and extends through this contact to the other pole of normally open contact 159. Terminal 143 on resistor 137 is connected by wire 169 to the other pole of normally open contact 151. Contact 144 on resistor 137 is connected by wire 171 to one pole of normally open contact 152. Contact 146 on resistor 137 is connected by wire 172 to normally closed contact 154, the other pole of which is connected to normally open contact 161. Thus the proper sequential action of the three relays establish circuits in the secondary circuit of the motor 27 each having a different degree of effective resistance. This sequential operation is provided by normally closed switches 173, 174 and normally open switches 176, 177 and 178 arranged to be actuated in sequence of cams 96 mounted on rod 97.

When the pressure within the cylinder 93 is at maximum, it is desired that the torque of the motor 27 be reduced to its minimum value which requires the maximum resistance in the secondary circuit of the motor 27. Under such conditions, the rod 97 will be moved to the right as seen in FIGURE 6 compressing the spring 98. In this position switches 178, 177 and 176 are open while switches 174 and 173 are closed. Under these circumstances, none of the relay coils will be energized and resistors 134 and 136 will be effective in two phases of the secondary of the motor 27. Resistor 137 will not be connected in the secondary circuit and is therefore equivalent to infinite resistance. Power for operating the relay coils 156, 157 and 158 is obtained from the secondary 163 of transformer 164, the primary of which is connected across any two wires to the motor stator 129. One leg of this secondary circuit 163 is connected by wire 180 to one pole of contact 176, one pole of contact 177, and one pole of contact 174. The other pole of contact 174 is connected by wire 179 to one pole of contact 178, the other pole of which is connected by wire 181 to the other side of secondary 163 through relay coil 156. The remaining pole of contact 177 is connected by wire 182 to one pole of switch 173, the other pole of which is connected by wire 183 through coil 157 to the said other leg of secondary 163. The remaining contact of switch 176 is connected by wire 184 through coil 158 to wire 186 which is in turn connected to the secondary 163.

As the pressure in the cylinder 93 decreases, the rod 97 will move to the left as seen in FIGURE 6 under the influence of spring 98. This movement closes switch 178 which completes the circuit through relay coil 156. This closes contact 151 and opens normally closed contact 153. The full value of all three resistors 134, 136 and 137 is thus effective in the secondary circuit of the motor. A further reduction in pressure closes switch 177 energizing coil 157 which in turn opens contact 154 and closes contact 152. This reduces the resistance in resistor 137 but permits the previously established resistance to remain in resistors 134 and 136. The next increment of movement of the rod 197 to the left closes switch 176 energizing coil 158 and closes contacts 159, 161, and 162. This in effect completes a connection between terminal 141 and terminal 139 reducing the effective value of resistance 134 to a minimum. Continued movement of the rod 97 to the left opens switch 174 which de-energizes coil 156 thereby opening contact 151 and closing contact 153. This circuit change reduces the value of the resistor 136 to a minimum. The next movement of the rod 97 to the left opens switch 173 which opens the circuit through coil 157. This allows contact 154 to close while contact 152 opens. This reduces the value of resistance in resistor 137 to a minimum and represents condition in which the motor can exert its maximum starting torque.

It will be noted that the circuit is arranged in such manner as to provide full starting torque to the motor 27 when the handle 128 is moved to either the raise or to the lower position although obviously any initial torque could be selected. When the motor reaches its desired speed, as determined by the valve 51, the pressure in the line 49 will increase, moving the rod 97 in a direction reducing the torque available to the motor 27. The reduction in torque will continue until the speed of the motor 27 and the output of the pump 32 has been reduced to a point where it is sufficient only to maintain the desired speed and pressure in the hydraulic system.

Hoisting devices normally incorporate a limit switch adapted to limit the upward travel of the load being lifted and are usually arranged in such manner as to engage the load directly. Such a limit switch is indicated at 187 and is arranged in series with coil 123 with hoist contactor 121 which is in turn arranged in series with switch 126. The limit switch 187 is normally closed and is opened by engagement with the load, thereby interrupting the circuit through coil 123 which in turn opens the relay 121 and prevents further hoisting movement. This does not however affect the circuit through the lowering coil 124 which can be actuated regardless of condition of switch 187.

A variable auto transformer 188 is continuously supplied with power from the line communicating with trolley wires 112 and 113. A sliding contact 189 is mounted on the control handle 127 and normally contacts the coil of auto transformer 188 at its middle point, dividing the incoming voltage in half. The contact 189 is connected by wire 191 to trolley wire 116 which through pickup 118 connects to one of the windings 192 of the two phase servo motor 87. The circuit through this coil extends through sliding contact 193 of variable auto transformer 88 connected in the secondary 163 of the transformer 164. One leg of the secondary 163 is connected through condenser 89 to winding 194 of motor 87, the connection being completed by connection of the winding 194 to wire 186. Movement of the control handle 128 thereby varies the voltage on the motor winding 192 causing the motor to run in one direction or the other depending on whether the voltage is increased or decreased by movement of the control handle 128. The sliding contact 193 (FIGURE 2) is connected by a shaft 196 to the gear train 85 and therefore moves in such direction as to bring the voltage effective on the winding 192 to substantially zero. When this position is reached, the motor will no longer run and the valve 69 will be in a position corresponding to the displacement of the handle 128 from neutral position.

The operation of our device is reasonably apparent from the foregoing description. To place the apparatus in operation, the disconnect switch 119 is closed thus establishing a potential across the auto transformer 188. Movement of the control handle 128 thereafter will close either switch 126 or switch 127 depending on the direction of movement, thus energizing either the hoisting contactor 121 or the lowering contactor 122. This supplies power to the trolley wires 112, 113, 114, 116, and 117 energizing transformer 164 and the stator 129 of the motor 27. It also energizes solenoid 31, opening the motor brake 28, and energizes solenoid 104, opening solenoid valve 102. The same movement of the control handle moves the sliding contact 189 along the coil 188 imposing a voltage on coil 192 of the servo motor 87. This voltage causes the motor 87 to run, driving the sliding contact 193 along the auto transformer 88 until the voltage in coil 192 has been reduced to a point where it is no longer sufficient to rotate the motor 87. It will be understood that the coil 194 of the motor 87 is continuously energized from the transformer 164. Movement of the motor 87 opens the control valve 51 to a degree proportionate to displacement of the handle 128 from neutral. The motor will therefore turn in the desired direction, lifting the load 14 and increasing in speed until the volume of fluid discharged from the pump 32 approaches the volume that the valve 51 is set to pass. At this point the pressure in the hydraulic system, including pipe 92, increases to such a point that the piston 94 is moved to the right as in FIGURE 6, thereby establishing circuits which increase the resistance of the motor secondary and reduce the torque of the motor until it is sufficient only to maintain the speed of movement selected by the operator. Excess torque transmitted to the pump 32 by either the motor 27 or the load 14 is neutralized and excessive speeds prevented.

When the operator returns the handle 128 to neutral, the contactors 122 and 121 open de-energizing the motor 27 and the coils 31 and 104 which in turn close the valve 102 and permit application of the motor brake 28. Motor 87 also returns valve 51 to closed position, thus blocking discharge of the pump 32 and braking the system. If the energy transmitted to the pump 32 is greater than the system can immediately absorb with safety, the relief valve 111 will open, permitting liquid to bypass the valves 102 and 51 until the excess pressure is relieved.

When the hoist is operated in a lowering direction, the mass of the load 14 is usually sufficient to drive the motor 27 in a lowering direction even though no power is applied to the motor. The circuit described is arranged in such manner that the minimum amount of power required to drive a very light load downwardly is applied to the motor 27 when moving in a lowering direction and the braking effort utilized to retard movement of the load during lowering is supplied by the hydraulic system, which under such circumstances absorbs both the torque developed by the load and the small amount of torque developed by the motor 27. If it is known in advance that the load 14 will always be sufficient to drive the motor 27 in a lowering direction, the circuit can be appropriately modified in an obvious manner to eliminate the application of electrical power to the motor when operating in this direction of rotation.

The particular form of servo motor described in connection with FIGURES 2 and 6 is but one of several adapted for the purpose. Another suitable form is illustrated diagrammatically in FIGURE 7 and employs a shunt wound direct current motor 197 having an armature 198 and a field winding 199. The motor 197 also has a shaft indicated at 201 connected to the stem 76 of the valve 69 either directly or through a gear train. A suitable spring 202 is employed to constantly urge the stem 76 toward a closed position, the torque developed by the spring 202 being opposed by torque developed by the motor 197. The field winding 199 of the motor 197 is energized at a constant voltage from a rectifier 203 connected to two primary leads to the motor 27. A second rectifier 204 supplies direct current to the armature 198 and is connected by wire 206 to one of the primary leads to motor 27. Wire 207 connects the rectifier 204 to wire 116 through sliding contact 118.

Figure 7:
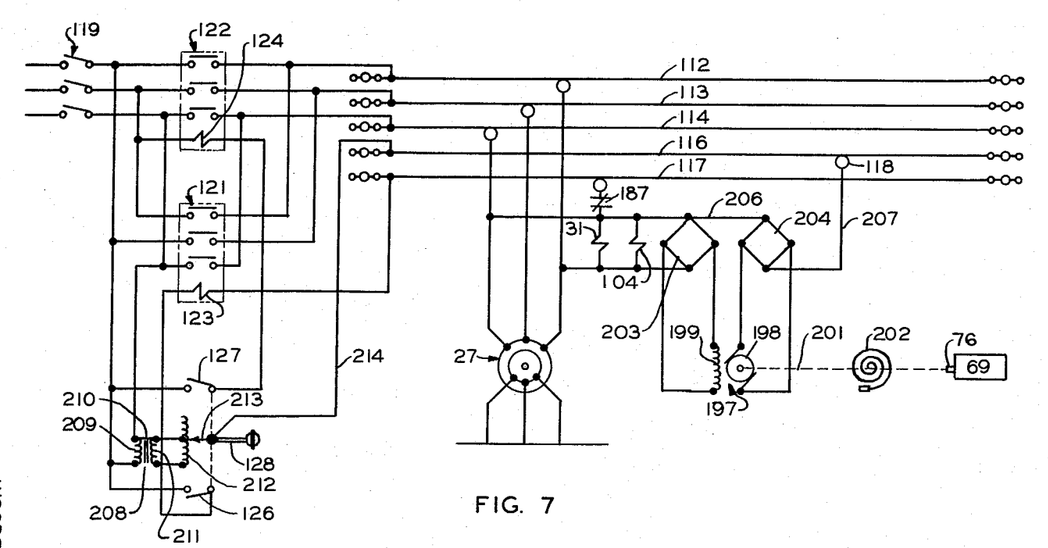
FIGURE 7 is a schematic wiring diagram of another circuit also suitable for use in connection with the device illustrated in FIGURE 1.

A transformer 208 has a primary winding 209 connecting across wires 112 and 114 ahead of the relays 121 and 122 in such manner that it is constantly energized during the period the disconnect switch 119 is closed. A secondary winding 211 of the transformer 208 is connected at one point by a jumper 210 to the primary 209 and to a variable auto transformer 212 in such manner as to impose its voltage across one half of the coil of the auto transformer. Operator's handle 128 is provided with a sliding contact 213 movable along the coil of the auto transformer 212 and normally spring centered in a conventional manner at the midpoint of the winding. A wire 214 connects sliding contact 213 with wire 116 thus completing the circuit to rectifier 204.

When the operator's handle 128 is in the neutral position, the sliding contact 213 is at the midpoint and therefore does not impose an A.C. voltage across the rectifier 204 and will not therefore transmit a direct current voltage to the armature 198. Movement of the operator's handle 128 from neutral also closes either switch 127 or switch 126 closing either contactor 121 or 122 thus energizing the motor 27 and the field rectifier 203. The torque developed by the motor 197 is proportional to the imposed voltage, the field 199 being a constant. The torque developed by the motor 197 is opposed by the torque of the spring 202 which automatically returns the shaft to a position in which it closes the valve 69 whenever the torque of the motor 197 falls to zero. Thus, the angular position of the shaft 201 and therefore the opening or setting of the valve 69 very directly with the voltage imposed on the motor armature 198.

The remainder of the circuit may be substantially similar to that previously described except that if desired the valve 102 and its attached solenoid 104 may be eliminated. The function of the valve 102 is to insure blocking of the pump discharge in the event of power failure. In the form of circuit illustrated in FIGURE 7, the spring 202 closes the valve 69, corresponding to the valve 51, automatically if torque is not applied to the motor 197. This constitutes a susbtantially complete blockage of the pump 32 thus making the valve 102 unnecessary in most instances.

The complexity of the circuits illustrated in FIGURES 6 and 7 may be substantially reduced by eliminating the relays 147, 148 and 149, which may be accomplished by causing the piston rod 97 to switch the secondary resistance directly by opening and closing contacts wired in the secondary circuit. When such a circuit is employed, a relatively larger number of switches or contacts should be employed so that the difference in potential between one point and the next succeeding point is kept to a minimum.

Figure 8:
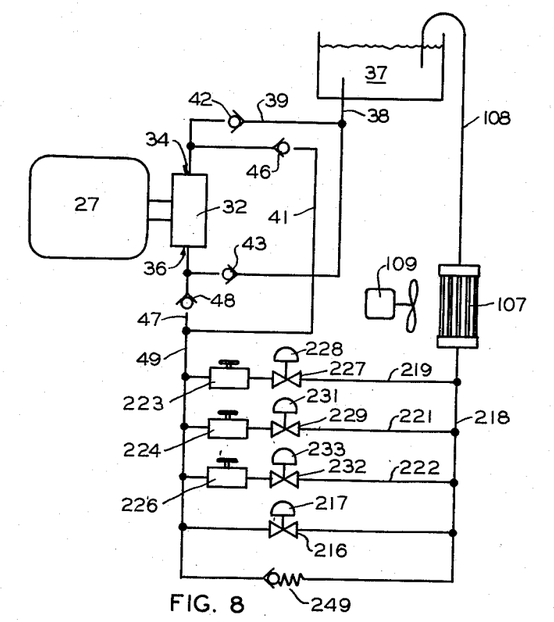
FIGURE 8 is a schematic diagram of a modified device incorporating this invention.
Figure 9:
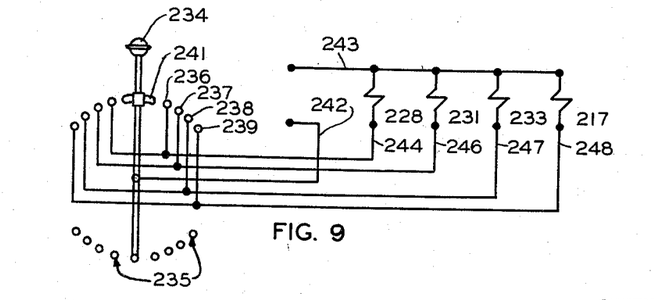
FIGURE 9 is a partial schematic electrical diagram suitable for use with the device shown in FIGURE 8.

It will be noted that the preceding description has referred to systems in which the speed control is of a stepless nature. A stepwise control is illustrated in FIGURES 8 and 9 and is considerably simpler, in many respects, than those previously described. In this system the motor 27 and the pump 32 are arranged in a manner previously described which results in the discharge of the pump output through pipe 49 regardless of the direction of motor rotation. In this modification, however, the pipe 49 communicates with a solenoid valve 216 having a solenoid 217 and connected to discharge into a pipe 218 communicating with the heat exchanger 107 and the reservoir 37. Pipes 219, 221 and 222 each connect pipe 49 with pipe 218 establishing parallel hydraulic circuits. Flow control or throttling valves 223, 224 and 226 are arranged in pipes 219, 221 and 222 respectively. Solenoid valve 227 having solenoid 228 is also disposed in pipe 219 in series with valve 223. Solenoid valve 229 having solenoid 231 is disposed in pipe 221 in hydraulic series with valve 224. Solenoid valve 232 having a solenoid 233 is disposed in pipe 222 in series with valve 226.

An operator's control handle 234 mounted for pivotable operation is connected in conventional manner to energize the motor 27 and shift the resistance effective in the secondary circuit of said motor through a number of points, indicated at 235. In addition to the contacts employed for this purpose, I provide a plurality of additional contacts 236, 237, 238 and 239 adapted to be engaged by a sliding contact 241 carried by the handle 234. The length of the contact 241 is such that all of the contacts 236–239 can be closed when the operator's handle 234 is in its extreme position. It will be understood, of course, that the structure illustrated is diagrammatic and that the specific components or circuits employed to accomplish the desired circiuts may be varied as required.

A wire 242 from a suitable source of power is connected to contact 241. Another wire 243 from the same power source is connected to one terminal of solenoids 228, 231, 233, and 217. The other terminals of these solenoids are connected by wires 244, 246, 247 and 248 to contacts 236, 237, 238 and 239 respectively.

As the operator's handle 234 is moved clockwise, as in FIGURE 9, the contact 241 engages contact 236 closing the circuit through coil 228 which opens valve 227. At the same time the motor 27 is energized in conventional manner permitting fluid to flow from the pipe 49 through valves 223 and 227 to reservoir 37. As the handle 234 is moved to the next speed point, the contact 241 will engage both contacts 236 and 237 thus holding valve 227 open and in addition opening valve 229. The flow permitted by valve 224 is thus supplemented by the flow of valve 223 allowing the motor 27 to revolve at a higher speed. Additional movement of the handle 234 opens in sequence valves 232 and 217. When the valve 216 is open, an unrestricted discharge is established thus permitting the motor to travel at synchronous speed. When the operator's handle is returned to neutral, the solenoid valves close, blocking discharge of the pump 32 and bring the motor 27 to a stop. Since this movement can occur suddenly, a relief valve 249 is connected between pipes 49 and 218 relieving any excessive pressure which may be developed.

From the foregoing it is obvious that the soleinoid valves could, if desired, be arranged to open and close in sequence rather than holding all preceding valves open, providing the capacity of the particular flow control valve placed in the hydraulic circuit in each instance is sufficient to permit the desired motor speed on that particular speed setting.

Figure 10:
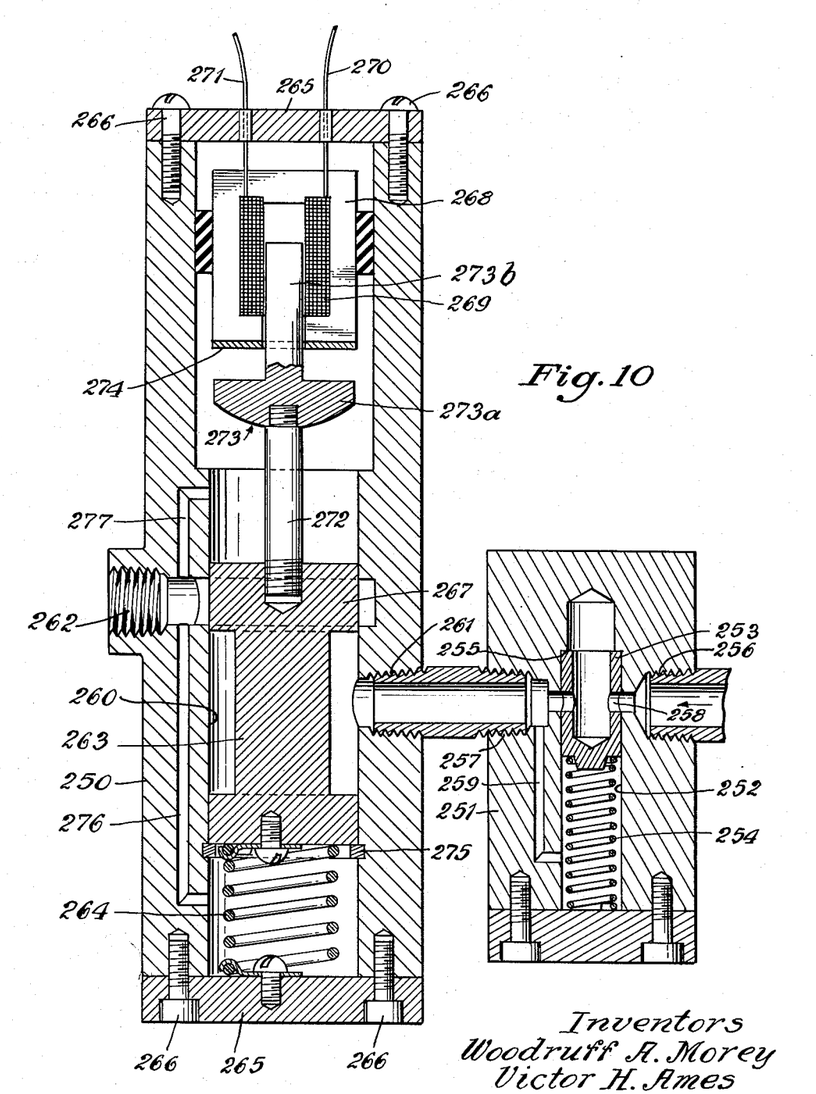
FIGURE 10 is a vertical section of a valve structure.
Figure 11:
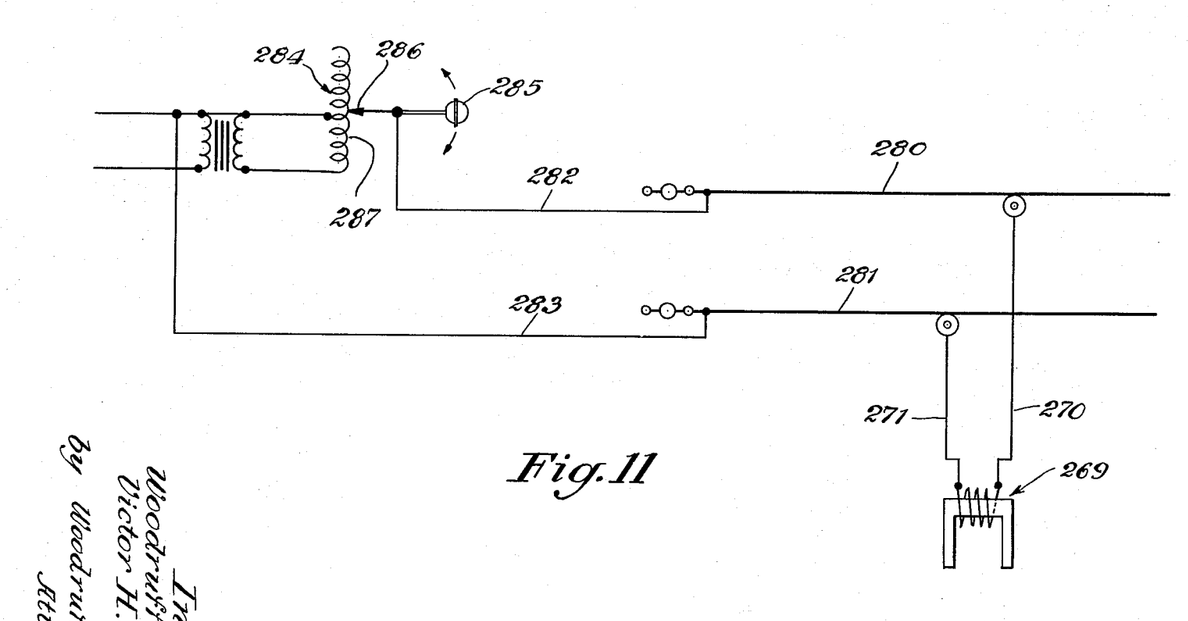
FIGURE 11 is a wiring diagram.

A further variation is shown in FIGURES 10 and 11 and is similar to but is a variation of the flow control valve shown in FIGURE 2. The unit is shown in two portions—a housing 250 and a body member 251, although they might be one. The body has a chamber or bore 252 with a piston 253 slidable therein and biased by a spring 254 to its fully opened position against a shoulder 255. The body has a threaded inlet port 256 and a threaded outlet port 257 in communication with the bore, and the piston has radial ports 258 controling communication between the inlet and outlet. A suitable conduit 259 connects the outlet with the portion of the bore under the pitson.

The valve housing 250 has a bore or chamber 260 with a suitable threaded inlet 261 connected by a pipe to the outlet 257 and a similarly threaded outlet 262. A valve element 263, shown in the form of a conventional dumbbell valve, is disposed slidably in the bore and connected to a tension spring 264. The ends of the housing may be closed by covers or caps 265 and held by suitable bolts 266 or the like. The upper lobe 267 of the dumbbell valve controls the outlet.

A solenoid indicated generally at 268, and supported in any suitable manner, may be generally horseshoe shaped and provided with a coil 269 and connected by suitable leads 270 and 271 to a source of current. While 268 functions in part as a magnet and in part as a solenoid, we shall refer to it as a solenoid hereinafter. The leads extend through suitable openings in the housing which may be suitably insulated and sealed to prevent leakage.

A bolt or stud 272 extends from the dumbell valve to an armature 273 which has a portion 273a opposite the solenoid and attracted by its magnetic effect and also a core portion 273b extending into the coil and functioning as the solenoid core. A stop 274 in the form of a brass ring or the like may be provided on the coil to prevent metal to metal contact between the part 273a and the solenoid. The housing has a suitable stop 275, in the form of a snap ring or otherwise, which determines the fully closed position of the valve as moved by the tension spring. The valve travel between fully closed and fully opened is defined by the stops 275 and 274. A passage 276 communicates the discharge or outlet 262 with the chamber under or behind the valve element and a similar passage 277 connects the outlet with the chamber containing the solenoid.

The solenoid is preferably supplied with A.C. current. We desire to provide a solenoid actuated valve that, in response to various signal voltages applied to the solenoid, will be moved to any one of a number of intermediate positions between fully closed and fully opened. To do this, we use a spring having a rate greater than the solenoid rate throughout the entire valve travel. By spring rate we mean the force of the spring per unit of displacement, either tension or compression. By solenoid rate we means the force of the solenoid per unit of displacement, with the force of the solenoid being a function of the applied voltage and the distance between the core and armature. The valve travel or valve displacement may be considered as the distance, either linear or rotary, between fully opened and fully closed.

Figure 12:
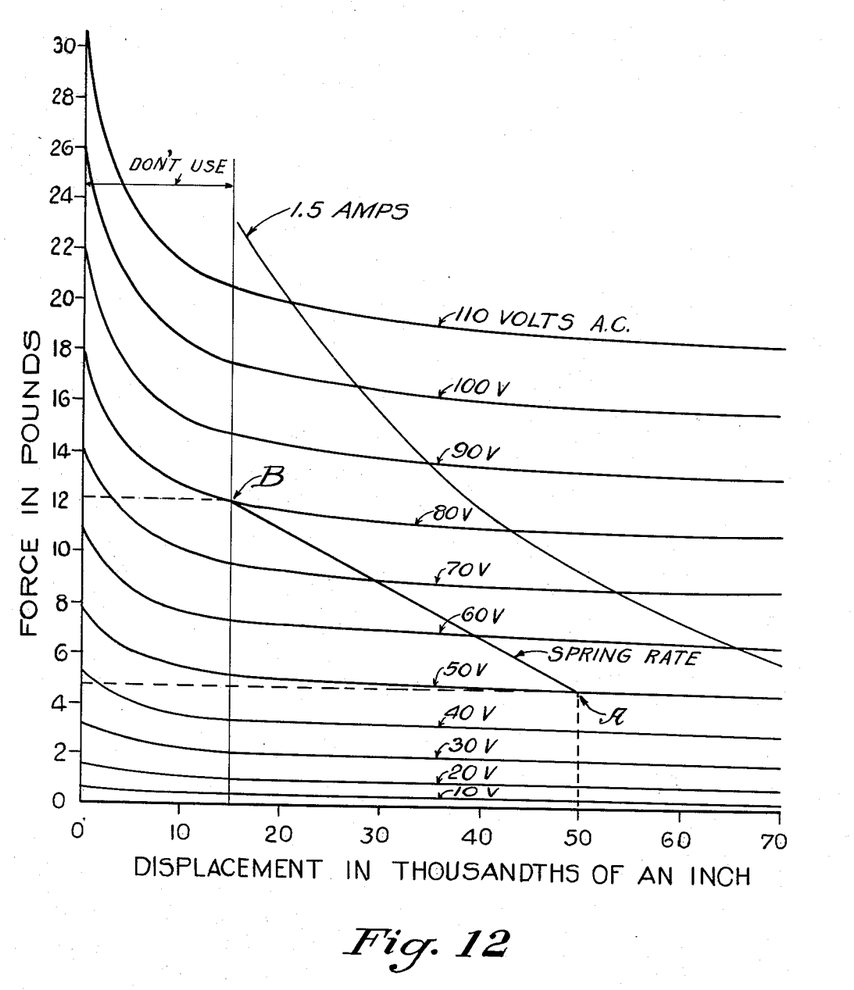
FIGURE 12 is a force versus displacement diagram for a valve in accordance with this invention.

As an example, in FIGURE 12 we have illustrated a chart with force in pounds as the ordinate and displacement in thousandths of an inch as the abscisa. Plotted thereon are the voltage curves for a plurality of signal voltages running from 0 volts to 110 volts. We have shown the 1.5 ampere curve and various lesser amperage curves could be plotted but they have been eliminated for clarity. It is important that the spring rate exceed the solenoid rate throughout the valve travel from fully closed to fully opened. If the solenoid rate exceeds the spring rate at any point, the valve will snap fully open or closed.

As an example, and referring to FIGURE 12, assume that we want to select a spring rate for a valve travel from .050″ to .015″ or a total displacement of .035″ for signal voltages on the solenoid varying from, say 50 to 80 volts. Accordingly, point A corresponding to 50 volts and .050″ displacement and point B corresponding to 80 volts and .015″ displacement determine the spring rate. At point B, the force on the spring will be approximately 12.1 lbs. while at point A the force will be approximately 4.4 lbs. giving a difference of 7.7 lbs. Dividing the total valve travel or displacement, .035″, into the force difference, 7.7 lbs., we find that a spring rate of 220 lbs. per inch is necessary. It should be noticed that the line drawn between points A and B labeled "Spring Rate" has a slope or tangent that is greater at all points than the slope of all voltage lines between .015″ displacement and .050″ displacement. The operating range of the solenoid and spring is, therefore, between .015 and 0.50 displacement, and accordingly the stops 274 and 275 should be set to limit valve movement to this range or less. In this example, any signal voltages above 80 volts will produce no modulation of the valve, and it would be best not to operate above the spring rate line because the solenoid might be overheated and damaged.

To this point, we are referring to a constant rate spring, but it should be understood that springs with varying rates are available and could be used, for example, springs with varying pitch, variable wire size, or variable coil diameter. In any event, whether the spring rate is constant or variable, the important point is that the spring rate in all displaced positions of the total displacement should be greater than the solenoid rate within the operating range of valve travel or displacement.

In FIGURE 11 we have shown a portion of a circuit diagram for the solenoid indicated generally at 269. The leads 270 and 271 have slider pickups 278 and 279 contracting trolley wires 280 and 281. Suitable leads 282 and 283 connect the trolley wires to an auto-transformer, indicated generally at 284. The lead 282 is connected to a control handle 285 which has a pointer 286 contacting the coil 287 which may be similar, for example, to the auto-transformer 212 in FIGURE 7. We have eliminated the other details of the wiring diagram but they could be the same as in the previous embodiments.

In each of the systems described it will be noted that the motor is brought to a stop primarily by blocking the discharge of the positive displacement pump 32, which is mechanically coupled to the motor 27 and the load 14. The rate at which the braking torque is applied can be varied in known manner and therefore applied either gradually or suddenly as necessary. The elimination of friction surfaces is highly desirable since the heat and wear normally developed by friction brakes is eliminated. Because the hydraulic braking provides a majority of the braking effort required, the work of the motor brake 28 is reduced and its life increased. The primary function of the motor brake is to hold the system motionless after it has been brought to a stop rather than providing the braking effort required to bring the system to a motionless condition. The heat developed in the hydraulic fluid by the hydraulic braking effort is easily dissipated at a high rate. Ordinarily the length of the hydraulic piping associated with the system and the surface area of the hydraulic reservoir 37 are sufficient to maintain the hydraulic system temperature at a safe level by radiation and connection to the atmosphere, but in the event this proves insufficient, the conventional heat exchanger 107 can be added. Because the control of the motor speed is in the preferred form stepless, a high order of control accuracy can be attained, particularly when moving the load 14 in a lowering direction. The automatic shifting of the resistance in the secondary circuit of the motor in the preferred form prevents abuse of the system by an operator who might otherwise apply full power to the motor and at the same time restrict its speed by means of the throttling valve 51. Thus the device provides highly flexible and safe motor speed control in a manner which promotes long life and minimum maintenance without sacrificing performance or incorporating a high order of complexity.

It is desirable in a majority of instances to utilize a hydraulic pump of sufficient capacity to permit its use as a brake but in some instances where this is undesirable, the speed function of this invention can be retained by utilizing only a small pump having sufficient capacity to produce movement of the hydraulic servo motor. Such devices may at times be utilized when the load is not of the over-running type and are sometimes encountered in systems driven by internal combustion engines requiring speed control due to load fluctuation. The hydraulic servo motor in such a device may be connected to the throttle control.

The solenoid controled valve of FIGURE 10 has the spring rate balanced against the solenoid rate so that the movement of the valve will be approximately in direct proportion to the voltage applied to the solenoid. The solenoid is enclosed in the housing and no leakage is encountered because the input members are merely wires which can be easily sealed as compared to the O-ring required for the shaft 76 in the FIGURE 2 form.

We claim:

1. Apparatus for controlling the speed of a variable torque motor having a shaft, comprising a positive displacement hydraulic pump mechanically coupled to the shaft, said pump having an inlet and an outlet, a source of hydraulic fluid connected to the pump inlet, control means for varying the torque of said motor, variable throttling valve means connected to the pump outlet for restricting the pump discharge, and means connected with said control means and operating therewith for varying the throttling valve means whereby the speed of the motor is limited, 2. Apparatus for controlling the speed of a variable torque electric motor having a shaft, comprising a positive displacement hydraulic pump mechanically coupled to the motor shaft, said pump having an inlet and an outlet, electric control means varying the torque of said motor, a source of hydraulic fluid connected to the pump inlet, variable throttling valve means connected to the pump outlet for limiting the pump discharge, and means connected with the electric control means and operating therewith for varying the throttling valve means whereby the speed of the motor is limited.

3. Apparatus for controlling the speed of a variable torque electric motor having a shaft, comprising a positive displacement hydraulic pump mechanically coupled to the motor shaft and having an inlet and an outlet, a source of hydraulic fluid connected to the pump inlet, electric control means for varying the torque of the motor, flow control valve means connected to the pump outlet and including a movable pressure responsive member for restricting hydraulic flow in excess of a given volume, and means connected to the electric control means for varying the said given volume of the flow control valve means.

4. Apparatus for controlling the speed of a variable torque motor having a shaft, comprising a positive displacement pump mechanically coupled to said shaft, said pump having an inlet and an outlet, liquid supply means communicating with the pump inlet, a throttling valve communicating with the pump outlet, pressure responsive means connected between the pump outlet and the throttling valve, and motor torque control means responsive to said pressure responsive means for reducing the motor torque as the pressure applied to the pressure responsive means increases.

5. Apparatus for controlling the speed of a variable torque electric motor having a shaft, comprising a positive displacement pump mechanically coupled to said shaft, said pump having an inlet and an outlet, liquid supply means communicating with the pump inlet, a variable flow control valve communicating with pump outlet, electric motor torque control means for varying the torque of said motor and pressure responsive means connected between the pump outlet and the variable flow control valve for shifting said motor torque control means in a direction reducing motor torque as the pressure applied to the pressure responsive means increases whereby the torque of the motor is reduced substantially to that required to attain the speed corresponding to the flow control valve setting.

6. Apparatus for controlling the speed of a variable torque electric motor having a shaft, comprising a positive displacement pump mechanically coupled to said shaft, said pump having an inlet and an outlet, liquid supply means communicating with the pump inlet, a variable flow control valve having an inlet communicating with the pump outlet, said flow control valve including a variable discharge orifice and a member movable across the inlet port of the valve responsive to inlet pressure change in a direction maintaining the pressure drop across the valve orifice substantially constant, electric motor torque control means for varying the torque of said motor, and pressure responsive means connected between the pump outlet and the variable flow control valve for shifting said motor torque control means in a direction reducing motor torque as the pressure applied to the pressure responsive means increases whereby the torque of the motor is reduced substantially to that required to attain the speed corresponding to the flow control valve setting.

7. The structure defined in claim 4 which includes a normally closed valve down stream from said pump outlet and means actuable by the motor torque control means for opening said valve.

8. The structure defined in claim 4 in which the pressure responsive means comprises a piston and cylinder.

9. The structure defined in claim 8 which includes a spring opposing movement of the piston responsive to hydraulic pressure in the cylinder.

10. The structure defined in claim 5 wherein the motor torque control means comprises a plurality of contacts arranged for opening and closing in series by movement of said pressure responsive means.

11. The structure defined in claim 10 wherein the pressure responsive means comprises a piston and cylinder.

12. The structure defined in claim 10 wherein the said pressure responsive means includes a cylinder, a piston in the cylinder, a piston rod on the piston and cam surfaces on the piston rod arranged for actuation of said plurality of said contacts when the piston is moved responsive to hydraulic pressure in the cylinder.

13. The structure defined in claim 5 which includes a spring for driving the flow control valve toward closed position, a shunt wound direct current motor having a shaft coupled to said flow control valve, said motor having a field winding and an armature winding, constant voltage means for energizing one of said windings, and variable voltage means for energizing the other of said windings in a direction opposing said spring.

14. The structure defined in claim 13 wherein the variable voltages are applied to the armature winding of the motor.

15. The structure defined in claim 4 which includes flow restricting means disposed between said pressure responsive means and a conduit connecting the pump outlet and the throttle valve.

16. The structure defined in claim 15 wherein said flow restricting means includes a variable orifice.

17. The structure defined in claim 1 which includes a normally closed shut-off valve for blocking the discharge of said pump, and means linked with the torque control means for opening said valve.

18. In hoist apparatus of the type including a cable drum, a gear train driving the drum and an electric motor having a shaft coupled to the gear train, the improvement comprising a reversible positive displacement hydraulic pump coupled to the motor shaft, liquid supply means connected to the pump, valve means establishing a single discharge conduit for said pump, variable flow control valve means connected to said single discharge conduit, pressure responsive means also connected to the discharge conduit including a cylinder, a piston for the cylinder, a projecting piston rod and a return spring for the piston, and means for varying the torque of the electric motor disposed and arranged for actuation by movement of the piston rod.

19. The structure defined in claim 18 in which the means for varying the torque of the motor includes a plurality of contacts arranged in series for progressive actuation by movement of the piston rod.

20. The structure defined in claim 18 which includes a normally closed solenoid valve in the single discharge conduit and means for energizing said solenoid for opening the valve when power is supplied to the electric motor.

21. In combination, a source of mechanical power having a rotatable drive shaft adapted to move a load, a positive displacement hydraulic device, a driving connection between the drive shaft and the hydraulic device, control means for the power source for varying the torque supplied by the power source to the drive shaft, control means for the hydraulic device for varying the rate of movement of the hydraulic device, and a connection between said control means whereby the speed of movement of the load is positively controlled by the hydraulic device in accordance with the setting of the hydraulic device control means.

22. In combination, a variable torque motor adapted to move a load therefor, a driving connection between them, means for varying the power generated by the motor, positive displacement hydraulic means positively connected for operation with the motor and load, a source of hydraulic fluid associated with the hydraulic means, a control for the hydraulic means, and means responsive to the control for the hydraulic means for controlling the motor power varying means whereby the speed of the motor is controlled independent of load in response to the hydraulic means.

23. In a mechanism for controlling a rotary shaft source of mechanical power having a control and a drive shaft, a positive displacement hydraulic pump connected to the drive shaft, an inlet and outlet for the pump, a hydraulic fluid source connected to the pump inlet, a variable throttle connected to the pump outlet, and means responsive to pump outlet pressure for controlling the power source control.

24. The structure of claim 23 further characterized by and including means for operating the variable throttle from a remote point.

References Cited in the file of this patent

UNITED STATES PATENTS

| | | |
|---|---|---|
| Re. 24,168 | Pell | June 19, 1956 |
| 2,152,570 | Scates | Mar. 28, 1939 |
| 2,437,996 | Carnegie et al. | Mar. 16, 1948 |
| 2,612,188 | Persons | Sept. 30, 1952 |
| 2,698,159 | Crum | Dec. 28, 1954 |

FOREIGN PATENTS

| | | |
|---|---|---|
| 519,580 | France | June 27, 1921 |